United States Patent [19]

Pobuta et al.

[11] E Re. 30,996

[45] Reissued Jul. 20, 1982

[54] STRAP TENSION SENSING AND CUT OFF MECHANISM

[75] Inventors: Walter Pobuta, Elizabeth; Charles Dolgos, Linden, both of N.J.

[73] Assignee: Thomas & Betts Corporation, Raritan, N.J.

[21] Appl. No.: 100,119

[22] Filed: Dec. 4, 1979

Related U.S. Patent Documents

Reissue of:

[64] Patent No.: 4,064,918
Issued: Dec. 27, 1977
Appl. No.: 776,489
Filed: Mar. 10, 1977

[51] Int. Cl.[3] ..... B21F 9/02

[52] U.S. Cl. ..... 140/123.6

[58] Field of Search ..... 100/29; 140/93 A, 93.2, 140/123.5, 123.6

[56] References Cited

U.S. PATENT DOCUMENTS

| | | | |
|---|---|---|---|
| 3,169,560 | 2/1965 | Caveney et al. | 140/123.6 |
| 3,891,012 | 6/1975 | Bakermans | 140/93 A |
| 3,931,838 | 1/1976 | Bakermans | 140/123.6 |
| 3,946,769 | 3/1976 | Caveney et al. | 140/93.2 |
| 3,993,109 | 11/1976 | Fortsch | 140/123.6 |
| 4,094,342 | 6/1978 | Nishikawa et al. | 140/93.2 |

*Primary Examiner*—Ervin M. Combs
*Attorney, Agent, or Firm*—Robert M. Rodrick; Jesse Woldman

[57] ABSTRACT

A tension sensing and cut off control mechanism which operates independently of the mechanism for drawing tight a closed loop bundling strap placed about objects to be bundled. Within a stationary block, affixed to one end of a tool housing, is placed a movable block held stationary by a displaceable pin. Adjustable loading means engage said pin to control its movement based on the tension to be applied to the strap. Below the established load a separate pawl mechanism draws the strap up about the bundle. When the load on the pin is exceeded, the movable block is moved by the strap head causing a blade means to sever the strap adjacent the head and all parts return to their original positions.

29 Claims, 27 Drawing Figures

STRAP TENSION SENSING AND CUT OFF MECHANISM

Matter enclosed in heavy brackets [ ] appears in the original patent but forms no part of this reissue specification; matter printed in italics indicates the additions made by reissue.

BACKGROUND OF THE INVENTION

1. Field of the Invention

The invention is directed to the field of bundling discrete objects into bundles. For example, forming a bundle of discrete drill rods, welding rods, etc. and more particularly to the bundling of a plurality of wires into a harness for simpler movement and attachment than would be possible with the wires handled alone.

2. Description of the Prior Art

In prior art tools of the type shown in U.S. Pat. No. 3,344,815 issued Oct. 3, 1967 for a "Strap Tightening and Cutting Tool" to G. R. Lawson et al and assigned to the assignee of the instant invention, the mechanism for sensing the strap tension and for initiating cut off are remote from the tool nose piece where the strap enters the tool and adjacent which the cut off blade travels. Accordingly, each tool must be separately designed and the optimum conditions for each mechanism compromised in the final tool. The handle 25 pivots about pivot 26 as the step 24 is drawn into the tool by the pawl engagement with the strap 24. Once the preset tension in spring 18 is exceeded the handle 25 pivot shifts from 26 to the pivot 31 and the rocker arm 15 is lifted by plate 21 causing cut off adjacent nosing 40. The various assemblies are placed at convenient locations not necessarily the best locations.

SUMMARY OF THE INVENTION

The present invention overcomes the difficulties noted above with respect to prior art devices by providing a mechanism for the sensing of strap tension and for severing the excess tail end portion beyond the strap head. Such mechanism is separate and apart from the housing, grips, triggers and pull bars, etc. which make up the remainder of the tool. The remainder of the tool can be mechanical as in a hand tool or may include pneumatic or hydraulic mechanisms as in bench tools.

The mechanism for setting the strap tension and for severing the excess tail end portion does not come into play until the strap about the bundle is drawn tightly enough such that the tension in the strap approaches the desired tension level set into the mechanism. In operation, the operator places the strap about the articles to be bundled and draws the strap up, tightening the strap loop about the bundle. The free tail end portion is then inserted into the tool through a slot in the nose piece, through the mechanism into the pawl mechanism. The operation of the trigger causes the pawl mechanism to draw the loop tighter. One or more trigger strokes may be used depending upon how tightly the operator draws the strap up manually. On release strokes of the trigger, the pawl mechanism travels non-engagingly over the strap to its initial position without affecting the strap. Once the strap tension approaches the tension setting of the mechanism, the mechanism is actuated to sever the free tail end portion of the strap beyond the strap head.

The mechanism for the sensing of the strap tension and for severing the excess tail end portion of the strap comprises a rigid, stationary block partially enclosing a movable block and having spring means to establish the initial position of said movable block with respect to said stationary block. The movable block carries a crank on a pivot pin and a severing blade on a further pivot pin. One arm of the crank engages the severing blade for operating the blade from its initial position out of contact with the strap to its strap severing position. The second arm of the crank is arranged to contact a shoulder of the stationary block. The movable block is contacted by the head of the stray without effect as long as the tension in the strap is less than a preset value, being prevented from moving with respect to the stationary block by a pin. The pin is free to move if the force which the movable block exerts on one end of the pin equals the force applied to the second end of the pin.

The force presetting mechanism comprises a segmented disk having slots extending inwardly from the outer periphery. Into these slots a detent is placed to hold the disk at any preset segment. On one surface of the disk is placed a cam surface varying in a linear fashion from the disk height to some greater height. A beam anchored at one end to the stationary block has its other end positioned on the cam. As a result of the position of the cam the beam places different forces upon the pin which rests on the beam at some point intermediate the beam ends. When the force on the top end of the pin exceeds the force on the lower end of the pin, the pin is displaced and the movable block is permitted to move in the stationary block, bringing the second arm into contact with the shoulder of the stationary block causing the crank to rotate about its pivot pin and move the severing blade into and through the strap. The severance of the strap removes the tension from the strap tail end portion and the movable block is free to return to its initial position under the influence of the spring means. It is an object of this invention to provide an improved tool.

It is an object of this invention to provide an improved tool for tightening a strap about objects to be bundled and severing the excess tail end portion.

It is another object of this invention to provide a mechanism for sensing the tension in a strap.

It is another object of this invention to provide a mechanism for sensing the tension in a strap and severing the excess strap portion.

It is another object of this invention to provide a presetable mechanism for sensing the tension in a strap.

It is still another object of this invention to provide a presetable mechanism for sensing the tension in a strap and severing the excess strap portion.

It is still another object of this invention to provide a mechanism for sensing the tension in a strap apart from the mechanism for drawing a strap tightly about a bundle.

It is yet another object of this invention to provide a mechanism for sensing the tension in a strap and severing the excess strap portion.

It is still another object of this invention to provide a presettable mechanism for sensing the tension in a strap and severing the excess strap portion apart from the mechanism for drawing a strap tightly about a bundle.

Other objects and features of the invention will be pointed out in the following descriptions and claims and illustrated in the accompanying drawings, which disclose, by way of example, the principles of the invention, and the best modes which have been contemplated for carrying them out.

BRIEF DESCRIPTION OF THE DRAWING

In the drawings in which similar elements are given similar reference characters.

DESCRIPTION OF THE PREFERRED EMBODIMENTS

Figure 1:
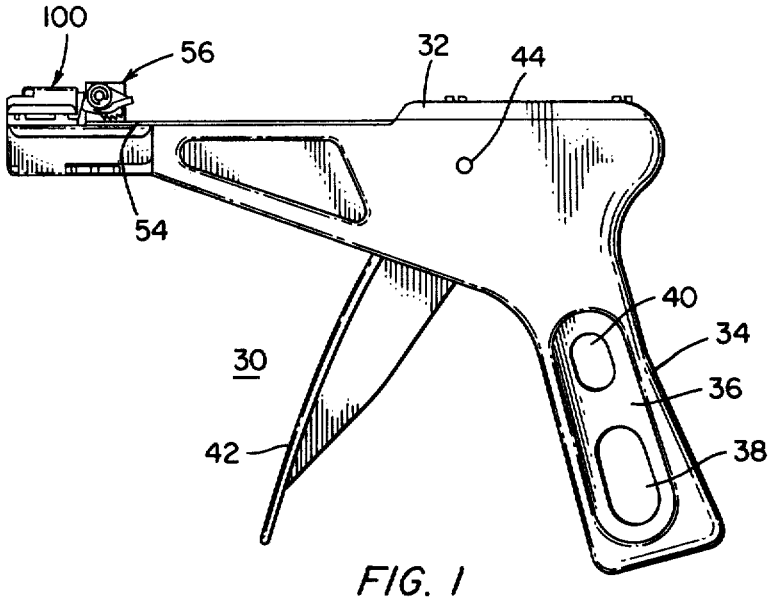
FIG. 1 is a side elevational view of a hand tool including a strap tension sensing and cut off mechanism constructed in accordance with the concepts of the invention.
Figure 2:
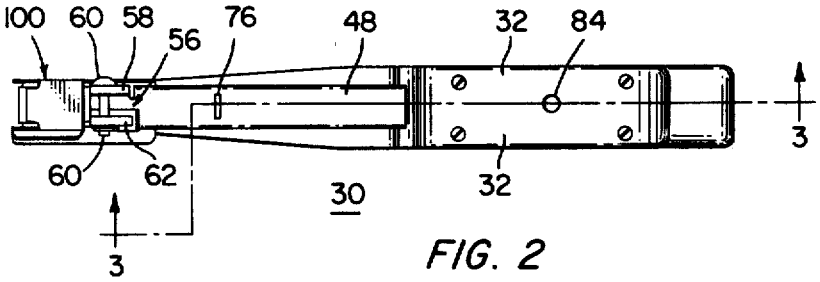
FIG. 2 is a top plan view of the tool of FIG. 1.
Figure 3:
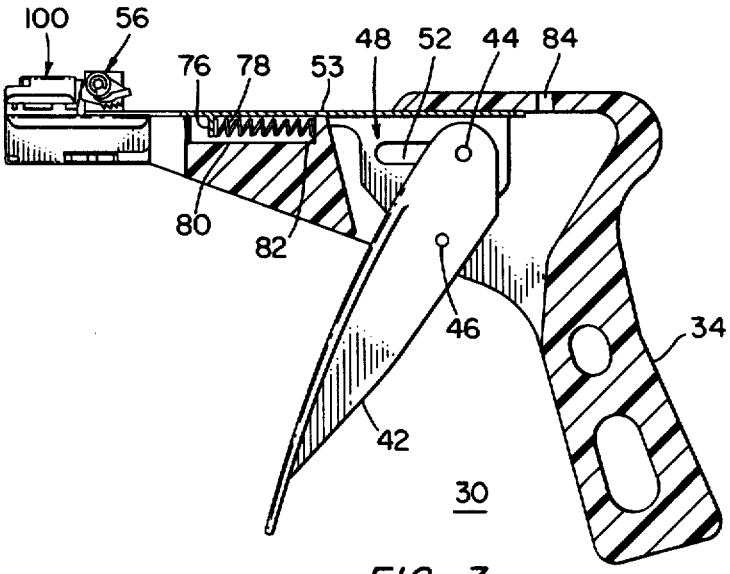
FIG. 3 is a side elevational view of the tool of FIG. 2 taken along the lines 3—3.
Figure 4:
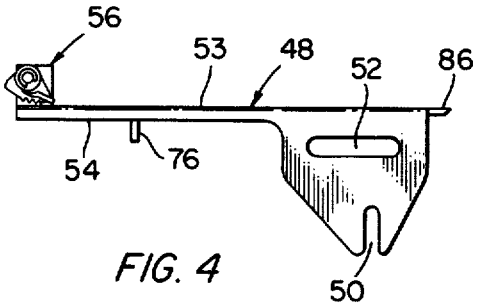
FIG. 4 is a side elevational view of the pull bar and pawl assembly of the tool of FIG. 1.
Figure 7:
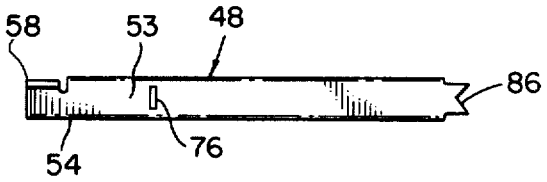
FIG. 7 is a top plan view of the pull bar of FIG. 4 with the pawl assembly omitted.
Figure 6:
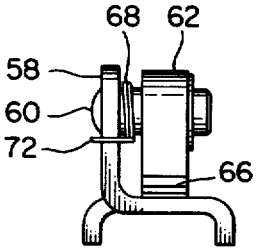
FIG. 6 is a front elevational view of the pawl assembly of FIG. 5.
Figure 5:
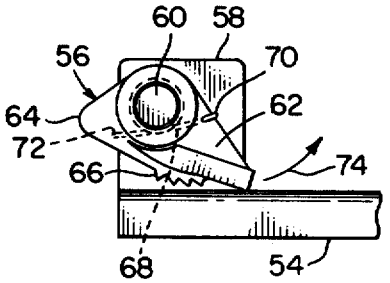
FIG. 5 is an enlarged side elevational view of the pawl assembly of the tool of FIG. 1.
Figure 9:
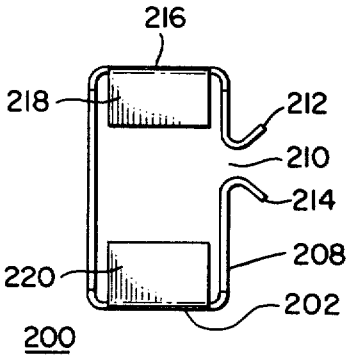
FIG. 9 is a front elevational view of the shroud of FIG. 8.
Figure 8:
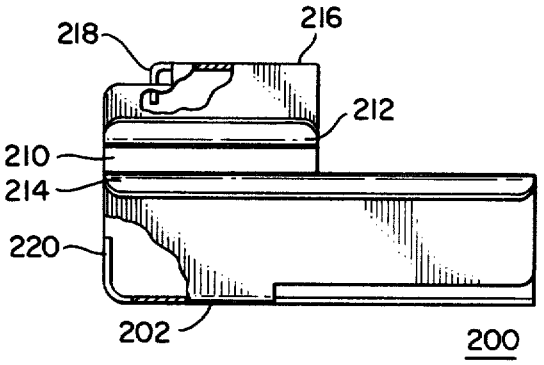
FIG. 8 is a side elevational view, partially cut away and partially in section of the shroud of the tool of FIG. 1.
Figure 10:
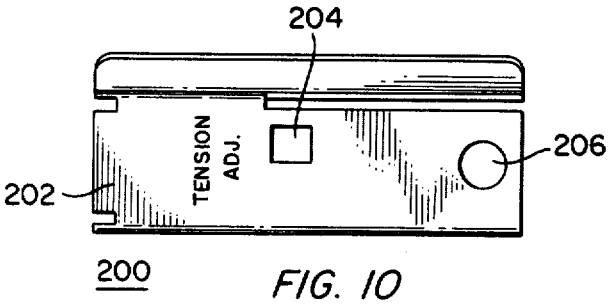
FIG. 10 is a bottom plan view of the shroud of FIG. 8.

Turning now to FIGS. 1 to 7, a tool 30 having a strap tension sensing and cut off mechanism 100 is shown. Tool 30 has a generally pistol configuration with a housing 32 ending in a fixed grip 34. The grip 34 may have a recessed area 36 and openings 38, 40 to make the overall tool 30 light in weight and well balanced. (See FIG. 1.) A movable trigger 42 is pivotally mounted to housing 32 (See FIG. 3) by pivot pin 44. The movable trigger 42 is coupled by pin 46 to a pull bar 48. The pull bar 48 has a slot 50 to accept pin 46 and a slot 52 to accept pivot pin 44. (See FIG. 4.) The slots 50, 52 permit the free movement of the pull bar 48 without regard for the position of the movable trigger 42.

Pull bar 48 has at its extreme left end 54 (see FIG. 4) a pawl assembly 56 mounted upon a tab 58 extending perpendicularly to the plane of the pull bar 48. Pin 60 pivotally connects pawl 62 to the tab 58 (see FIG. 5). Pawl 62 has a nose portion 64 and teeth 66. A torsion spring 68 has one arm 70 which engages pawl 62 and a second arm 72 which grips a marginal edge of the tab 58 to bias the teeth 66 of pawl 62 into contact with portion 53 of the pull bar 48. As will be evident below, when the pawl assembly 56 is in the position shown in FIG. 1, the nose portion 64 of pawl 62 will be in contact with a shoulder to cause the pawl 62 to rotate in the direction of the arrow 74 as it appears in FIG. 5. This pawl 62 rotation creates a space between the upper surface of portion 53 of pull bar 48 and the teeth 66 sufficient to permit the unimpeded entrance of a strap end portion. As movable trigger 42 is moved towards fixed grip 34, pin 46 is slot 50 likewise causes the rightward movement of pull bar 48 with pawl assembly 56. The termination of contact between nose portion 64 with the contact shoulder permits the pawl 62 to rotate in a direction opposite to the arrow 74 in FIG. 5 to bring teeth 66 in contact with the strap body holding it securely between the pawl 62 and portion 53 of pull bar 48. Any further movement of trigger 42 will pull a strap more tightly about articles to be bundled, as will be described below.

A tab 76 is affixed to the underside of pull bar portion 53 which engages a compression spring 78 in recess 80. One end of spring 78 engages tab 76 while the other end engages shoulder 82 of recess 80. Thus the pull bar 48 and pawl assembly 56 are always urged towards the initial position shown in FIG. 1. An aperture 84 (see FIG. 3) can receive the end of a wire (not shown) for cutting. This is accomplished by the sharpened V-notch blade 86 at the rightmost end of pull bar 48. The material of the housing 32 provides the supporting anvil for the cutting by blade 86.

Figure 24:
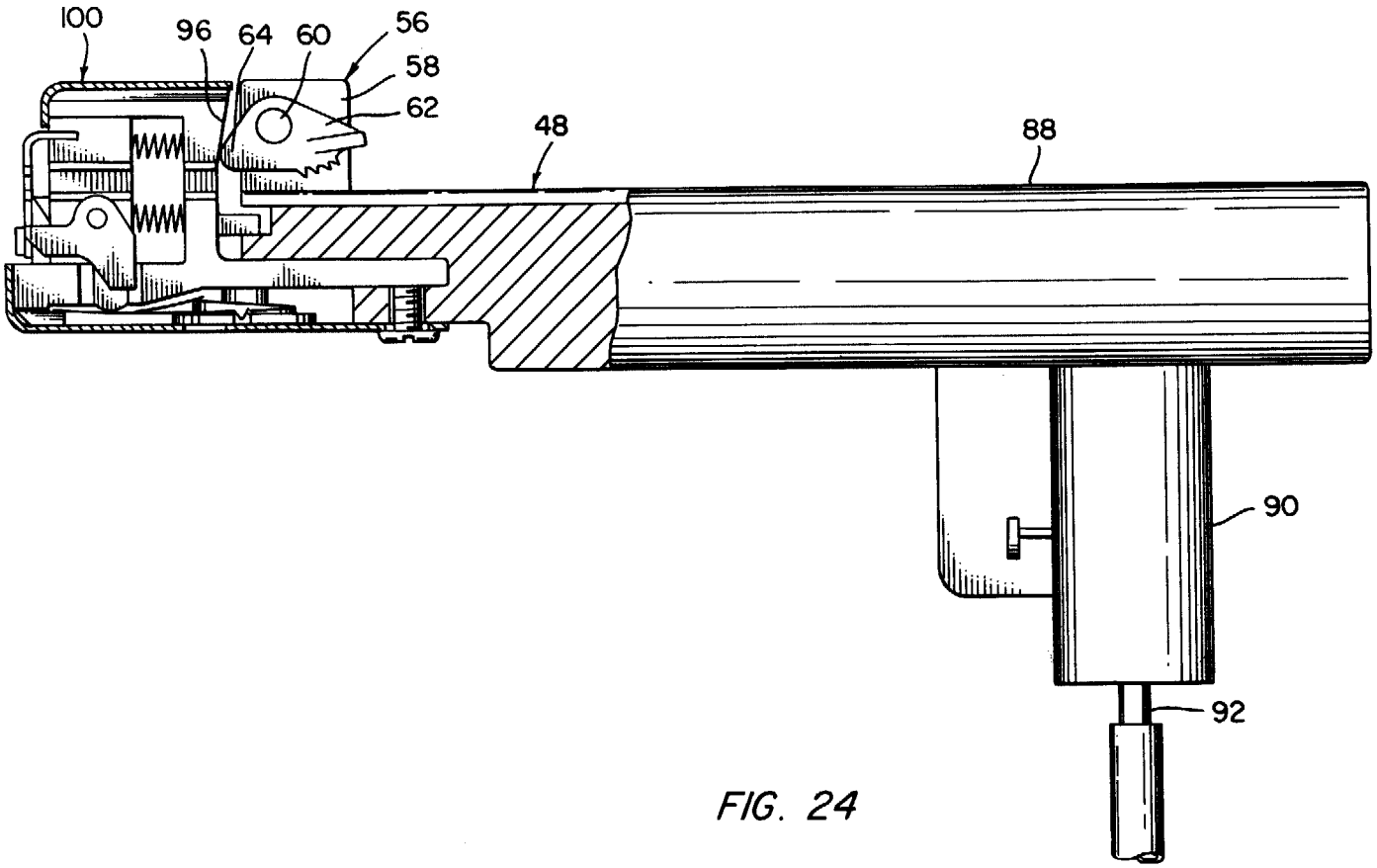
FIG. 24 is a side elevational view, partly cut away and partially in section, of a further tool employing the strap tension sensing and cut off mechanism.

In the description of the tool 30, a fully mechanical, hand tool is described. It is not necessary to power the pawl assembly 56 by hand power, instead a pneumatic or hydraulic cylinder can be used. In FIG. 24 there is shown a housing 88 containing a pneumatic cylinder. A grip 90 has a fitting 92 thereon for coupling to a source of pneumatic fluid. A pull bar 48 having a pawl assembly 56 thereon operates as described above with respect to pull bar 48. FIG. 24 also shows the opening of pawl assembly 56 to receive a strap. Nose portion 64 of pawl 62 is in contact with shoulder 96 which deflects pawl 62 in the direction of arrow 74 of FIG. 5. The nose portion 64 is urged against the shoulder 96 by a reset compression spring such as 78 in FIG. 3.

A further structure, the strap tension sensing and cut off mechanism 100, is also found adjacent the end 54 of the pull bar 48, however, mechanism 100 is coupled to housing 32 and does not move as a unit either with respect to pull bar 48 or housing 32. The mechanism 100 is not responsive directly to the tool 30 but only to a by-product of its operation. As will be described below in greater detail, a desired tension level is set into mechanism 100 and the tail end portion of a strap to be tightened to a preset tension is passed through the mechanism 100 into the pawl assembly 56. The head of a strap contacts the face of the mechanism 100 but does not move it until the tension in the strap reaches that preset at which time a movable block overcomes the detent mechanism and engages a lever to operate the severing blade to cut off the excess tail end portion.

Figure 15:
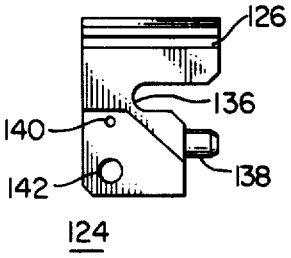
FIG. 15 is a front elevational view of the movable block of the assembly of FIG. 14.
Figure 16:
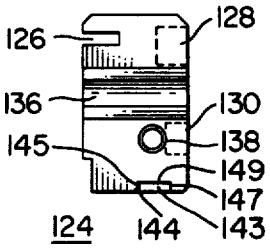
FIG. 16 is a side elevational view of the movable block of FIG. 15.
Figure 17:
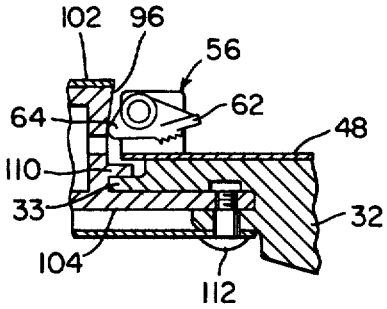
FIG. 17 is a fragmentary, sectional view of the engagement between the stationary block and the tool housing.
Figure 18:
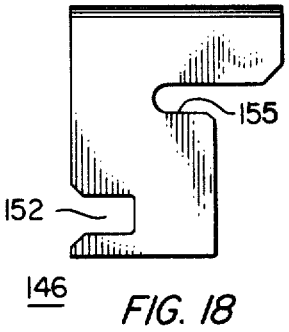
FIG. 18 is a front elevational view of the nose piece of the tool of FIG. 1.
Figure 19:
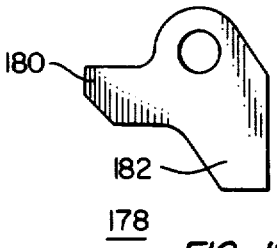
FIG. 19 is a side elevational view of the crank of FIG. 14.
Figure 20:
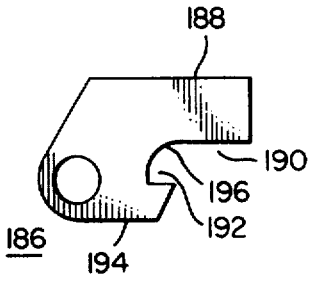
FIG. 20 is a front elevational view of the severing blade of the tool of FIG. 1.

Turning now to FIGS. 8 to 23, the details and operation of the strap tension sensing and cut off mechanism 100 is set out. A stationary block 102 (see FIG. 13) has a long tab 104 containing mounting aperture 106 and a further aperture 108 whose function will be described below. A short tab 110 extends above tab 104. The stationary block 102 is connected to a portion of the tool 30 housing 32 by means of a fastener 112 extending through an aperture in housing 32 into the aperture 106 (See FIG. 17). The tab 110 rests atop a flange 33 of housing 32 to give greater stability to the mechanism 100. A cavity 114 (See FIG. 13) faces away from housing 32 and contains recesses 116 and 118 to each receive a rest spring as will be described below. An extension 120 has an undercut portion 122. Placed inside of the cavity 114 is a movable block 124 shown best in FIGS. 15 and 16. Movable block 124 has a slot 126 in a front face thereof to receive a nose piece as will be described below. Recesses 128,130 are placed in a rear face of movable block 124 to receive the second ends of rest springs 132,134 (See FIG. 14) which extend between the movable block 124 and the stationary block 102. Spring 132 is received in recess 116 of stationary block 102 and recess 128 of movable block 124. Spring 134 is received in recess 118 of stationary block 102 and recess 130 of movable block 124. The springs 132,134 establish the initial position of movable block 124 with respect to stationary block 102.

A slot 136 in movable block 124 permits a strap to freely pass through block 124. A pivot pin 138 for the crank lever extends from the side of block 124 (See FIG. 15). An aperture 140 to receive one end of a torsion spring and an aperture 142 to receive a pivot pin for the serving blade are contained in the front face of movable block 124. Movable block 124 has a recess 143 having a front wall 145, a rear wall 147 and a perpendicular wall 149. The lower edge of front wall 145 is chamfered as at 144 which will engage a similarly tapered portion of a pin to be described below.

Figure 22:
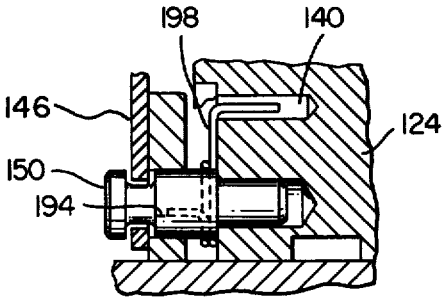
FIG. 22 is a fragmentary, partially sectional view of the severing blade assembly.
Figure 21:
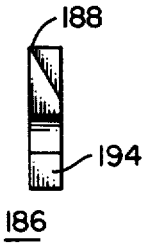
FIG. 21 is a side elevational view of the severing blade of FIG. 20.
Figure 23:
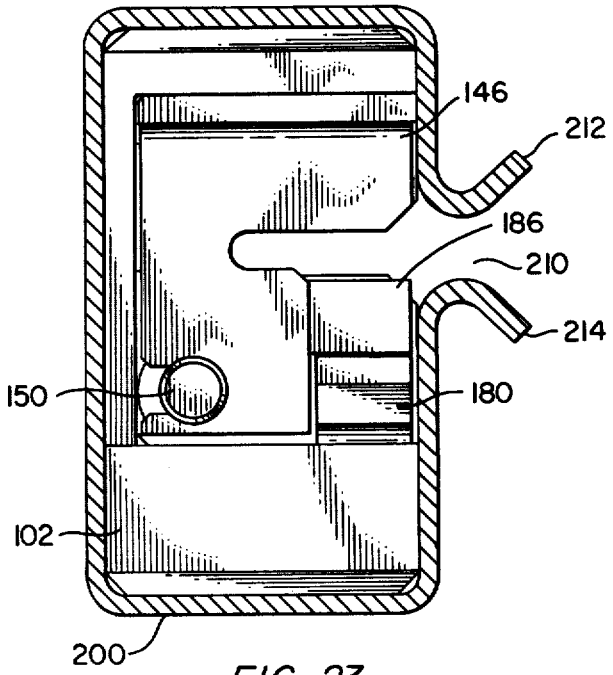
FIG. 23 is a front elevational view, partially in section, of the assembly of FIG. 14.

A nose piece 146 (see FIG. 18) has a leg 148 (See FIG. 14) for insertion in the slot 126 in the movable block 124 which together with pin 150 which passes through slot 152 anchors nose piece 146 to movable block 124 and sets its position therewith (See FIG. 22). Slot 155 permits passage of the strap through nose piece 146. The nose piece 146 provides a broad area which is placed in contact with a strap head and permits the response of the mechanism 100 to cause cut off of the excess strap portion. To prevent the movement of movable block 124, under the influence of a strap head as it is being pulled up or tightened, a pin 154 is employed (see FIG. 14). Pin 154 has a tapered end portion 156 which is complementary to the chamfered edge 144 of movable block 124. As will be described, when chamfered edge 144 places sufficient force on pin 154, pin 154 will be displaced downwardly in the direction of arrow 158 in FIG. 14 permitting movable block 124 to move towards the stationary block rear wall 159. The lower edge of pin 154 is rounded as at 160. The rounded edge 160 of pin 154 is made to bear against a beam 162 one end of which is supported in undercut 122 of stationary block 102 and the other edge upon a cam surface to be described. As will be evident below, the beam end on the cam surface will load the beam and thereby apply a force to the pin 154 resisting its movement in the direction of arrow 158. The resistance of pin 154 to movement will continue until the force transmitted by chamfered edge 144 of the movable block 124 to pin 154 exceeds the loading of the beam 162 at which time the pin 154 will be displaced.

Figure 11:
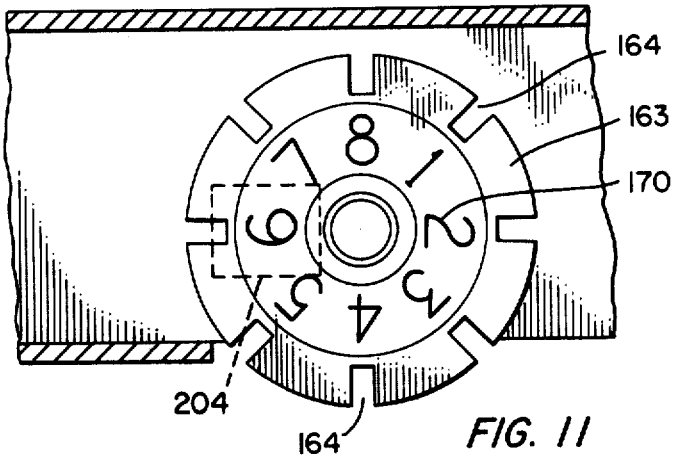
FIG. 11 is a fragmentary bottom plan view, partially in section, of the tension selection dial and the stationary block of the tool of FIG. 1.
Figure 12:
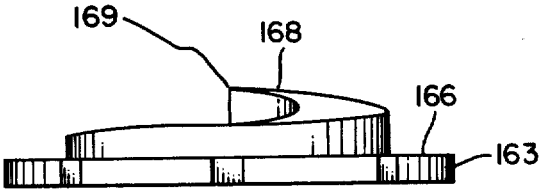
FIG. 12 is a side elevational view of the tension selection dial of FIG. 11.
Figure 13:
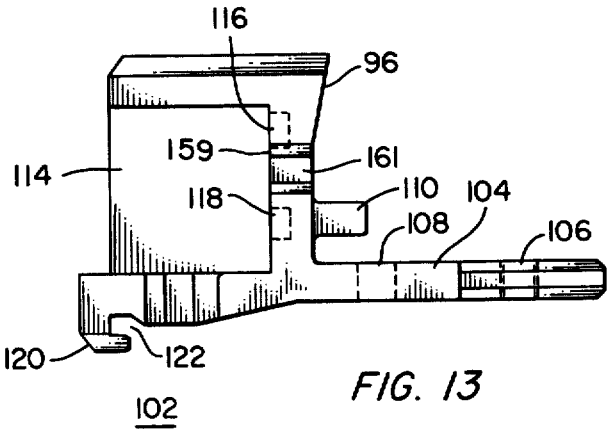
FIG. 13 is a side elevational view of the stationary block of the tool of FIG. 1.
Figure 14:
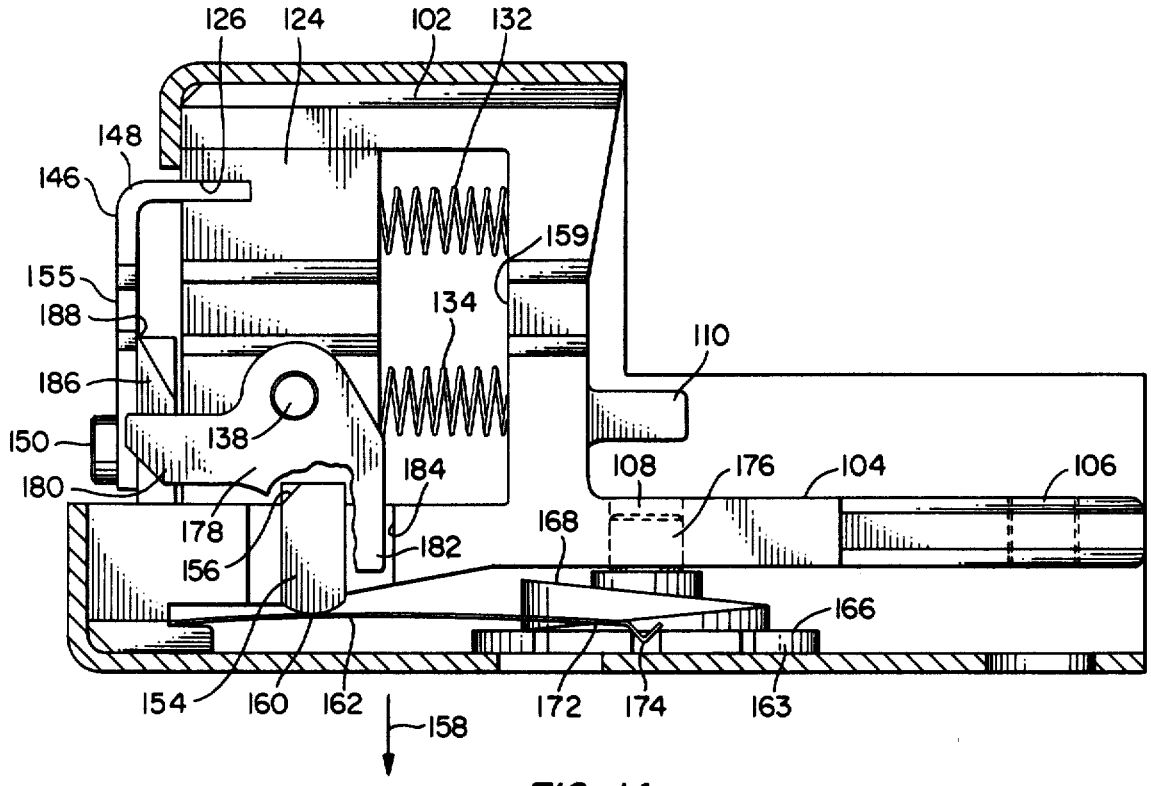
FIG. 14 is a side elevational view, partially cut away and partially in section, of a strap tension sensing and cut off mechanism assembly constructed in accordance with the concepts of the invention.

The mechanism for presetting the strap tension at which cut off will take place is described with reference to FIGS. 11, 12 and 14. A wheel 163 (see FIG. 11) has a plurality of slots 164 extending inwardly from the outer peripheral edge. Affixed to one planar surface 166 is a cam surface 168 (see FIG. 12) extending from the level of planar surface 166 to a maximum height 169. Beam 162 is anchored at one end in undercut 122 (see FIG. 13) and at its opposite end on the cam surface 168. As the beam 162 end is placed on a higher point of the cam surface 168, the beam 162 builds up a resisting force partially countering the downward force exerted by pin 154 upon beam 162 and thus requiring a greater force to displace pin 154 in the direction of arrow 158. The position of the cam surface 168 is identified by the indicia 170 on the opposite planar face of wheel 163 from that containing cam surface 168. The indicia is visible through a window in the shroud, to be described below. To hold the wheel 163 in its desired position a detent 172 is provided. Detent 172 has a finger 174 which can enter the slots 164 and prevent accidental movement of wheel 163. Wheel 163 is mounted upon pin 176 extending into aperture 108 of tab 104 of the stationary block 102.

Once the resistance force on pin 154 is overcome, the movable block 124 is now able to move within cavity 114 towards rear wall 159 of stationary block 102. A crank 178, shown in FIG. 19, has a first leg 180 to engage the severing blade and a second leg 182. The crank 178 is free to rotate about pivot pin 138 of the movable block 124. As the movable block 124 moves towards rear wall 159 of stationary block 102, the arm 182 of crank 178 contacts shoulder 184 of stationary block 102 and causes the crank 178 to rotate clockwise about the pivot pin 138 raising the first leg 180 of crank 178. Severing blade 186 (see FIGS. 20 and 21) has a sharp knife edge 188 and is pivotally mounted to the movable block 124 by the pin 150. Below the knife edge 188 is a slotted area with a shoulder 190, a slot 192 and a tab 194. As first leg 180 of crank 178 is raised it contacts shoulder 190 of blade 186 causing the blade to rotate counterclockwise about pin 150 cutting a strap passed above knife edge 188. The blade 186 is restored to its initial position, after crank 178 is reset by the torsion spring 198. One end of torsion spring 198 is positioned in aperture 140 of the movable block 124 and the other end rests upon tab 194, as is best seen in FIG. 22.

A shroud 200 is shown in FIGS. 8, 9, 10 and 14. Shroud 200 retains the various portions of mechanism 100 in place and provides for easy access thereto by the strap. The shroud 200 is formed of a single piece of metal having a bottom portion 202 having a window 204 and an aperture 206. The indicia 170 upon wheel 163 are visible through window 204, one at a time so that the operator knows the tension setting of the tool 30. Fastener 112 (see FIG. 17) passes through aperture 206 to hold the shroud 200 to housing 32. Side 208 has a slot 210 therein with the marginal edges 212, 214 contoured to provide a simple lead-in to slot 210 (see FIG. 9). Bent down tab 218 from top portion 216 and bent up tab 220 from bottom portion 202 sets the limit for the movement of movable block 124 away from rear wall 159 of stationary block 102, as is evident from FIG. 14.

Figure 25:
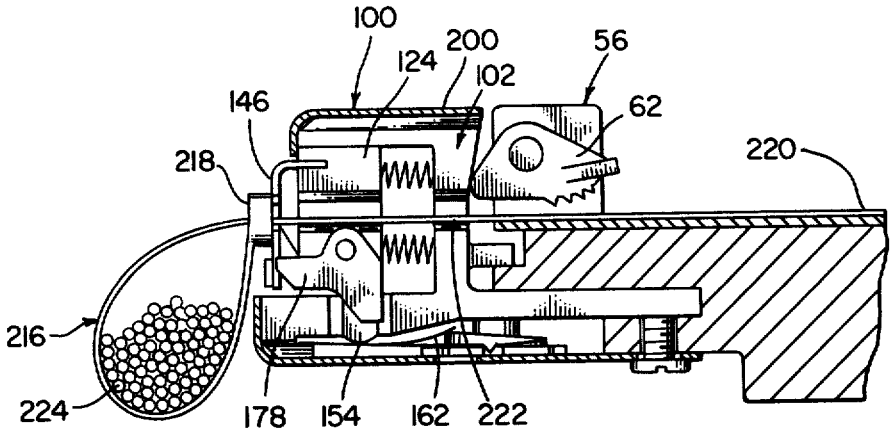
FIG. 25 is a fragmentary side elevational view of the tool of FIG. 1 in its initial condition with the free tail end portion of a looped strap introduced into the tool.
Figure 26:
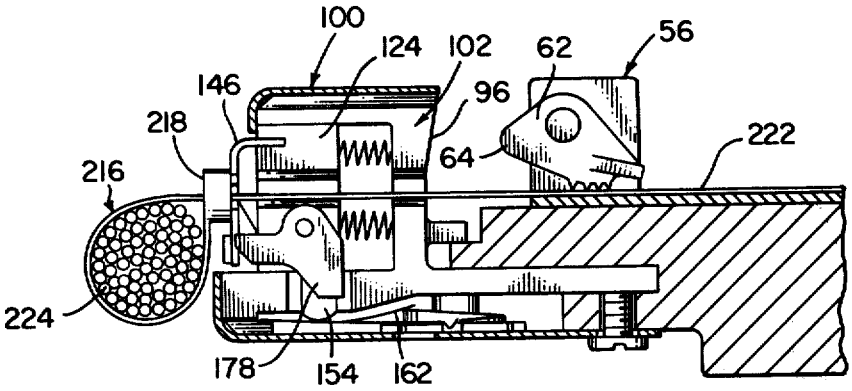
FIG. 26 shows the positions of the parts of FIG. 25 in an advanced position.
Figure 27:
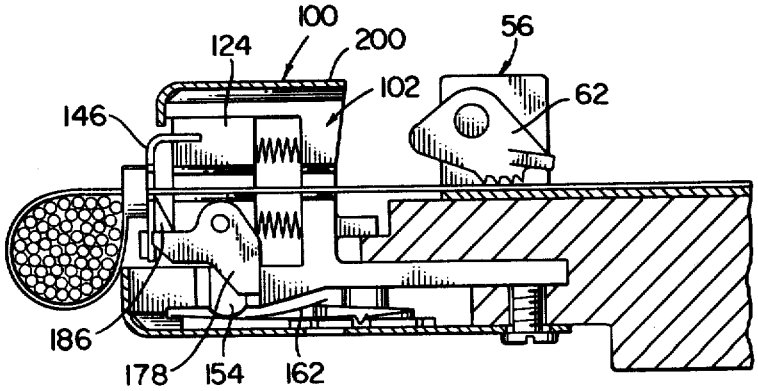
FIG. 27 shows the positions of the parts of FIG. 25 just prior to strap cut off.

Turning now to FIGS. 25, 26 and 27 the operation of the tool 30 of FIG. 1 is summarized. A strap 216 having a head end portion 218, a tail end portion 220 and a strap body portion 222 therebetween is looped about a plurality of discrete articles 224 to be formed into a bundle. The loop is formed by threading tail end portion 220 of the strap 216 through an aperture in head end portion 218. Also located in the head end portion 218 is a one way locking device (not shown) which will permit the strap 216 to be drawn up on the articles 224 but prevent the loop from being opened by a force applied to the strap 216. The tail end portion 220 is pulled up to a hand tight condition and then inserted through slot 210, slot 155 of nose piece 146, slot 136 of movable block 124, slot 161 of stationary block 102 to the space between the portion 53 of the pull bar 48 and the toothed portion 66 of pawl 62. The pawl 62 is being held away from the portion 53 of pull bar 48 by the contact of nose portion 64 of pawl 62 with shoulder 96 of stationary block 102. It is assumed that the wheel 163 has been set to the desired tension level.

Forces are now applied to movable trigger 42 to move it towards fixed grip 34. This causes pull bar 48 to move to the right as shown in FIG. 26. The termination of contact between nose portion 64 of pawl 62 and shoulder 96 of stationary block 102 permits the pawl 62 to rotate clockwise under the influence of torsion spring 68 and grip the strap 216 and pull the loop tighter about the articles 224. One or more strokes of movable trigger 42 may be required to pull up strap 216 to the desired tension. The release of the movable trigger 42 and its movement away from fixed grip 34 causes the pawl 62 to pass over the strap 216 in a non-engaging manner. The parts of tool 30 are maintained in the positions shown in FIG. 26 until the desired strap tension is sensed. At this time, as is shown in FIG. 27, the pin 154 is pushed out of its at rest position and the movable block 124 is permitted to move towards stationary block 102. The force for moving the movable block 124 is provided by the pull bar 48 and is applied by head portion 218 of strap 216 engaging the nose piece 146. Once movable block 124 is moved towards stationary block 102 the second leg 182 of crank 178 engages shoulder 184 to cause the crank 178 to move the blade 186 to the severing position. Once cut off has been completed the absence of force upon nose piece 146 permits the springs 132,134 to return movable block 124 to its initial position.

While there have been shown and described and pointed out the fundamental novel features of the invention as applied to the preferred embodiments, it will be understood that various omissions and substitutions and changes of the form and details of the device illustrated and in their operation may be made by those skilled in the art, without departing from the spirit of the invention.

We claim:

1. A strap tension sensing and cut off mechanism comprising: stationary block means having a first end and a second end and an intermediate wall intermediate said first and second ends; movable block means having a first end and a second end, said movable block means first end adjacent said stationary block means first end and said movable block means second end adjacent said intermediate wall; means for applying a force to said first end of said movable block means; pin means having a first position in engagement with said movable block means to prevent the movement of said movable block means in response to the force applied thereto and a second position out of engagement with said movable block means to permit movement of said movable block means in response to the force applied thereto; and selectively presettable means coupled to said stationary block means for applying a selected restraining force to said pin means to position said pin means in said first position; said pin means moved from said first to said second position when the force applied to said first end of said movable block means exceeds the selected restraining force upon said pin means.

2. A strap tension sensing and cut off mechanism as defined in claim 1 wherein said stationary block means further comprises an end wall adjacent said second end and said mechanism further comprises spring means coupled between said end wall and said second end of said movable block means to establish an initial position of said movable block means with respect to said stationary block means.

3. A strap tension sensing and cut off mechanism as defined in claim 1 wherein said selectively presettable means comprises a spring member to bias said pin means to said first position.

4. A strap tension sensing and cut off mechanism as defined in claim 1 wherein said selectively presettable means comprises a beam member to bias said pin means to said first position.

5. A strap tension sensing and cut off mechanism as defined in claim 1, wherein said selectively presettable means comprises an adjustable cam surface and a beam member having a first end and a second end; said beam member first end coupled to said stationary block means; said beam member second end engaging said cam surface and said beam member being engaged by said pin means intermediate said first and second ends of said beam member.

6. A strap tension sensing and cut off mechanism as defined in claim 5, wherein said selectively presettable means further comprises a notched wheel having segments corresponding to portions of said cam surface and a detent for engaging the notches of said notched wheel and retaining a selected cam surface portion adjacent said beam member second end.

7. A strap tension sensing and cut off mechanism as defined in claim 1, further comprising crank means pivotably coupled to said movable block means, said crank means having a first leg and a second leg, said second leg engageable with said intermediate wall of said stationary block member to pivot said crank.

8. A strap tension sensing and cut off mechanism as defined in claim 7, further comprising a severing blade coupled to said movable block means and engaged by said crank means first leg to sever said means for applying a force to said first end of said movable block means.

9. In a strap tightening and cut off tool of the type having a housing, a fixed grip coupled to said housing, a movable trigger coupled to said housing for relative movement with respect to said fixed grip; a pull bar having a pawl at one end to grip a strap inserted in said tool, said pull bar coupled at its second end to said movable trigger, said movable trigger causing said strap to be further drawn into said tool as said movable trigger is moved towards said fixed grip and permitting said pawl to nonengagingly move with respect to said strap as said movable trigger moves away from said fixed grip; a strap tension and cut off mechanism comprising: movable block means having a first position relative to said housing and a second position relative to said housing, said second position being closer to said housing than said first position; said movable block means engaged by the head of a strap and having a force exerted thereon by said strap head as said strap is drawn into said tool, said force tending to move said movable block means from said first position to said second position; blade means for severing the strap adjacent the head thereof; control means selectively presettable to any one of a plurality of positions for applying a selected restraining force to said movable block means to prevent said movable block means from moving from said first position to said second position; and movable link means coupled to said movable block means and moved in response to the movement of said movable block means from said first position to said second position, said movable link means also coupled to said blade means to operate said blade means to sever the strap when the force applied to said movable block means by the head of the strap is greater than the restraining force applied to said movable block means by said control means permitting said movable block means to move towards said second position thereby causing said movable link to move said blade means and sever the strap.

10. A strap tension and cut off mechanism as defined in claim 9 further comprising resilient means coupled to said movable block means for moving said movable block means to its first position after the strap is severed.

11. A strap tension and cut off mechanism as defined in claim 9 further comprising compression means coupled to said movable block means for moving said movable block means to its first position after the strap is severed.

12. A strap tension and cut off mechanism as defined in claim 9, further comprising spring means coupled to said blade means for returning said blade means to an initial position upon severance of the strap.

13. A strap tension and cut off mechanism as defined in claim 9, further comprising compression means coupled to said movable block means for moving said movable block means to its first position; and spring means coupled to said blade means for returning said blade means to an initial position; said compression means and said spring means both operating upon the severance of the strap.

14. A strap tension and cut off mechanism as defined in claim 9, further comprising a stationary block partially surrounding said movable block means; said stationary block having a first wall; and compression means coupled to said movable block means and said first wall of said stationary block to move said movable block means to its first position after the strap is severed.

15. A strap tension and cut off mechanism as defined in claim 9, further comprising a stationary block partially surrounding said movable block means; said stationary block having a first wall and a second wall; compression means coupled to said movable block means and said first wall of said stationary block to move said movable block means to its first position after the strap is severed; and a crank pivotally coupled to said movable block means, said crank having a first leg coupled to said blade means and a second leg to contact said second wall of said stationary block; whereby when said second leg of said crank contacts said second wall, said crank pivots to cause said crank first leg to move said blade means into severing engagement with a strap being drawn into said tool.

16. A strap tension and cut off mechanism as defined in claim 9, further comprising a nose member coupled to said movable block means; said nose member having a first surface positioned adjacent the path of movement of said blade means; and a slot in said nose member to align a strap placed in said tool with said blade means to facilitate severance of the strap.

17. A strap tension and cut off mechanism and defined in claim 9, wherein said control means comprises a pin engageable with said movable block means and means to control the movement of said pin.

18. A strap tension and cut off mechanism as defined in claim 9, wherein said control means comprises a pin engageable with said movable block means to control movement of said movable block means; cam means selectively positionable; and lever means engaging said cam means and said pin to determine the amount of force the head of the strap must exert upon said movable block means to cause severance of the strap.

19. A strap tension and cut off mechanism as defined in claim 9, wherein said control means comprises a pin engageable with said movable block means to control movement of said movable block means; a rotatable disk having a periphery slotted at predetermined positions and having a cam formed on one of the planar faces of said disk; detent means engageable with said slots to permit said disk to be locked at predetermined positions, positioning said cam accordingly; and lever means engaging said cam and said pin to determine the amount of force the head of the strap must exert upon said movable block means to cause severance of the strap.

20. A strap tension and cut off mechanism as defined in claim 9, wherein said control means comprises a pin having a tapered end engageable with a complementarily tapered portion of said movable block means to control movement of said movable block means; a rotatable disk having a periphery slotted at predetermined positions and having a cam formed on one of the planar faces of said disk; detent means engageable with said slots to permit said disk to be locked at predetermined positions, positioning said cam accordingly; indicia on the second planar face of said disk to identify the position of said cam; and lever means engaging said cam and said pin to determine the amount of force the head of the strap must exert upon said movable block means to cause severance of the strap.

21. A strap tightening and cut off tool for tightening a strap about a plurality of objects to be bundled and severing the excess tail portion comprising: a housing having a first end and a second end; a pull bar having a first end and a second end, said pull bar coupled to said housing and movable with respect thereto; drive means coupled to said pull bar second end for moving said pull bar with respect to said housing; pawl means capable of gripping a strap when moved in a direction towards said housing second end and nonengagingly moving over a strap when moved in a direction towards said housing first end; said pawl means coupled to said pull bar first end; stationary block means coupled to said housing first end; movable block means within said stationary block means, said movable block means being engaged by the head of a strap to be tightened, the head of the strap applying a force to said movable block means tending to move same towards said housing second end; blade means coupled to said movable block means; control means selectively presettable to any one of a plurality of positions for applying a restraining force to said movable block means to prevent the movement of said movable block means in response to the force applied by the head of the strap; and movable link means coupled to said movable block means and moved in response to the movement of said movable block means, said movable link means also coupled to said blade means to operate said blade means to sever the strap when the force applied to said movable block means by the head of the strap is greater than the restraining force applied to said movable block means and said movable block means is moved.

22. A strap tightening and cut off tool as defined in claim 21, wherein said control means comprises a presettable cam and a lever coupled to said cam and said stationary block means to prevent movement of said movable block means until the force applied by the head of the strap upon said movable block means exceeds the restraining force placed upon said movable block means.

*23. Strap tightening and cut off apparatus for tightening a strap about a plurality of objects to be bundled and severing the excess tail portion of the strap, said apparatus comprising: a housing defining an inlet for receiving such strap tail portion; strap pulling means supported in said housing interiorly of said inlet for grippingly engaging said strap tail portion and drawing said strap through said inlet; tension sensing means supported in said housing for contiguous engagement with said strap at a location between said inlet and the location of engagement of said strap pulling means and said strap; and cutting means in said housing for cutting said strap upon sensing of predetermined strap tension by said tension sensing means.*

*24. The apparatus claimed in claim 23, wherein said tension sensing means comprises a sensor element adjacent said inlet engaging said strap contiguously, said housing supporting said sensor element for movement in the direction of such drawing of said strap therein.*

*25. The apparatus claimed in claim 24, wherein said tension sensing means includes bias means for biasing said sensor element in a direction opposite such drawing direction.*

*26. The apparatus claimed in claim 25, wherein said tension sensing means includes releasable detent means for preventing movement of said sensor element in said drawing direction on strap tension less than said predetermined strap tension.*

*27. The apparatus claimed in claim 26, further including means responsive to movement of said sensor element to operate said cutting means.*

*28. The apparatus claimed in claim 23, further comprising a fixed grip coupled to said housing, a movable trigger coupled to said housing for relative movement with respect to said fixed grip; a pull bar in said strap pulling means having a pawl at one end to grip a strap inserted in said inlet, said pull bar coupled at its second end to said movable trigger, said movable trigger causing said strap to be further drawn into said tool as said movable trigger is moved towards said fixed grip and permitting said pawl to nonengagingly move with respect to said strap as said movable trigger moves away from said fixed grip.*

*29. The apparatus claimed in claim 23, wherein said housing has a first end and a second end; said strap pulling means includes a pull bar having a first end and a second end, said pull bar coupled to said housing and movable with respect thereto, drive means coupled to said pull bar second end for moving said pull bar with respect to said housing and pawl means capable of gripping a strap when moved in a direction towards said housing second end and nonengagingly moving over a strap when moved in a direction towards said housing first end, said pawl means coupled to said pull bar first end; said tension sensing means includes a stationary block coupled to said housing first end; a movable block within said stationary block, said movable block being engaged by a strap to be tightened; and said cutting means includes blade means coupled to said movable block for severing the strap upon movement of said movable block.*

* * * * *